United States Patent [19]

Susemihl

[11] Patent Number: 4,908,493
[45] Date of Patent: Mar. 13, 1990

[54] METHOD AND APPARATUS FOR OPTIMIZING THE EFFICIENCY AND QUALITY OF LASER MATERIAL PROCESSING

[75] Inventor: Ingo Susemihl, Norderstedt, Fed. Rep. of Germany

[73] Assignee: Midwest Research Institute, Kansas City, Mo.

[21] Appl. No.: 200,252

[22] Filed: May 31, 1988

[51] Int. Cl.⁴ .............................................. B23K 26/00
[52] U.S. Cl. ........................... 219/121.67; 219/121.72
[58] Field of Search ........... 219/121.6, 121.85, 121.63, 219/121.64, 121.72, 121.67

[56] References Cited

U.S. PATENT DOCUMENTS

| | | | |
|---|---|---|---|
| 3,594,532 | 7/1971 | Lunan | 219/121.6 |
| 4,125,755 | 11/1978 | Plamquist | 219/121.64 |
| 4,326,118 | 4/1982 | Smith | 219/121.63 |
| 4,466,739 | 8/1984 | Kasner et al. | 219/121.79 X |
| 4,471,204 | 9/1984 | Takafuji | 219/121.64 |
| 4,492,843 | 1/1985 | Miller | 219/121.64 X |
| 4,547,651 | 10/1985 | Maruyama | 219/121.67 |
| 4,578,554 | 3/1986 | Coulter | 219/121.63 |

FOREIGN PATENT DOCUMENTS 0048040 5/1978 Japan .
0100948 8/1979 Japan .

OTHER PUBLICATIONS

Penn Well Books, The Industrial Laser Annual Handbook 1986, pp. 301-305.

Primary Examiner—C. L. Albritton
Attorney, Agent, or Firm—Ken Richardson

[57] ABSTRACT

The efficiency of laser welding and other laser material processing is optimized according to this invention by rotating the plane of polarization of a linearly polarized laser beam in relation to a work piece of the material being processed simultaneously and in synchronization with steering the laser beam over the work piece so as to keep the plane of polarization parallel to either the plane of incidence or the direction of travel of the beam in relation to the work piece. Also, depending to some extent on the particular processing being accomplished, such as welding or fusing, the angle of incidence of the laser beam on the work piece is kept at or near the polarizing or Brewster's angle. The combination of maintaining the plane of polarization parallel to plane of incidence while also maintaining the angle of incidence at or near the polarizing or Brewster's angle results in only minimal, if any, reflection losses during laser welding. Also, coordinating rotation of the plane of polarization with the translation or steering of a work piece under a laser cutting beam maximizes efficiency and kerf geometry, regardless of the direction of cut.

21 Claims, 4 Drawing Sheets

METHOD AND APPARATUS FOR OPTIMIZING THE EFFICIENCY AND QUALITY OF LASER MATERIAL PROCESSING

The United States Government has rights in this invention under Contract No. DE-AC02-83CH10093 between the United States Department of Energy and the Solar Energy Research Institute, a Division of Midwest Research Institute.

BACKGROUND OF THE INVENTIONS

1. FIELD OF THE INVENTION

The present invention relates to laser processing of materials, and more specifically to a method and apparatus for more efficiently and precisely controlling and steering a laser beam for welding, cutting, machining, and marking materials.

2. DESCRIPTION OF THE PRIOR ART

The use of laser beams for welding, fusing, cutting, machining, marking, and other processing of materials is well known, although there have heretofore been some persistent, long-recognized problems that have inhibited the efficiency and cost-effectiveness of such laser beam processing for many practical applications. Since welding, fusing, cutting, machining, or marking all involve focusing the energy of a laser beam on the material being processed with sufficient power to melt the material, the single term "welding" is used for convenience in this discussion to include any or all of these material processing techniques, even though technically welding usually refers to joining work pieces together.

One of these persistent problems in laser welding has been energy losses due to reflection of the laser beam on the surface being welded. To minimize such losses due to reflection, it has become common and accepted practice to keep the laser beam oriented normal to the plane of the work piece being welded whenever possible. In other words, the angle of incidence is kept at or very near to 0°. Consequently, when the weld is to be linear, i.e., not merely a spot on the work piece surface, either the laser beam has to be moved over the work piece surface while maintaining the normal angle of incidence, or the work piece has to be moved under a stationary laser beam.

Since common industrial laser generators with enough power to weld are quite large and require substantial cooling apparatus, precision mounting and moving the laser generator is difficult and expensive. Therefore, most practitioners and industrial applications opt for moving the work piece under a stationary laser beam that is kept normal or near normal to the surface of the work piece to be welded. These features are common to the methods and apparatus disclosed in U.S. Pat. No. 4,492,843, issued to R. Miller, et al.; U.S. Pat. No. 4,471,204, issued to H. Takafuji, et. al., U.S. Pat. No. 4,326,118, issued to J. Smith, Japanese Pat. No. 53-48040, issued to Mitsubishi Electric Corp.; and Japanese Pat. No. 54-100948, and issued to Kawasaki Steel KK.

However, moving the work piece can create substantial problems as well. Some work pieces are large and difficult to handle. Also, many industrial and experimental processes are such that fastening and moving the work piece is impractical for other reasons. For example, some welding processes have to be done in vacuum chambers where enclosing precisely moveable work piece tables and changing work pieces in such vacuum chambers would be difficult and very expensive. Some work pieces may have many individual, perhaps even fragile, components to be welded in configurations where clamping and holding them in proper positions for welding is difficult, and movement prior to welding could displace them. Further, it has been found that in some circumstances, such as welding the edges of glass plates together, clamping the plates in position, welding, and then cooling in the clamped position creates internal stresses that annealing cannot eliminate, thus causing cracks in the finished material.

Consequently, there is a real need for being able to keep both the laser generator and the work piece stationary during welding. Some attempts to do so have included methods and apparatus for moving the laser beam itself over the work piece while maintaining both the laser generator and the work piece stationary. For example, U.S. Pat. No. 4,578,554, issued to L. Coulter, discloses the use of optical fibers to guide and move the laser beam over the work piece. U.S. Pat. No. 4,125,755 discloses a method of stacking work pieces in predetermined positions in relation to a stationary laser generator so that horizontal translation of a reflecting mirror while keeping a constant reflective angle moves the laser beam from point to point while still maintaining the vertical laser beam orientation and constant focus on the points to be welded. U.S. Pat. No. 3,594,532, issued to F. Lunan, et al., discloses an apparatus that moves the optical reflector and lens assembly in relation to a stationary laser generator and a stationary work piece in a manner that keeps the incident laser beam normal to the surface of the work piece.

Another significant, well-known problem of long duration in laser welding, and here perhaps more specific and significant to laser cutting, is the variations in kerfs due to polarization of the laser beam, as illustrated in FIGS. 1a–1d. The laser beam initially generated by a laser source is coherent, and possibly linearly polarized electromagnetic radiation. Electromagnetic radiation is propagated in waves comprised of an electric field E component and a magnetic field H component perpendicular to each other. In linearly polarized electromagnetic radiation, the E field components of all the wave fronts in the beam are directionally aligned with each other, i.e., the electric fields oscillate in only one direction, which is often called the electric vector or E-vector.

Figures 1A, 1B, 1C, 1D, 2:
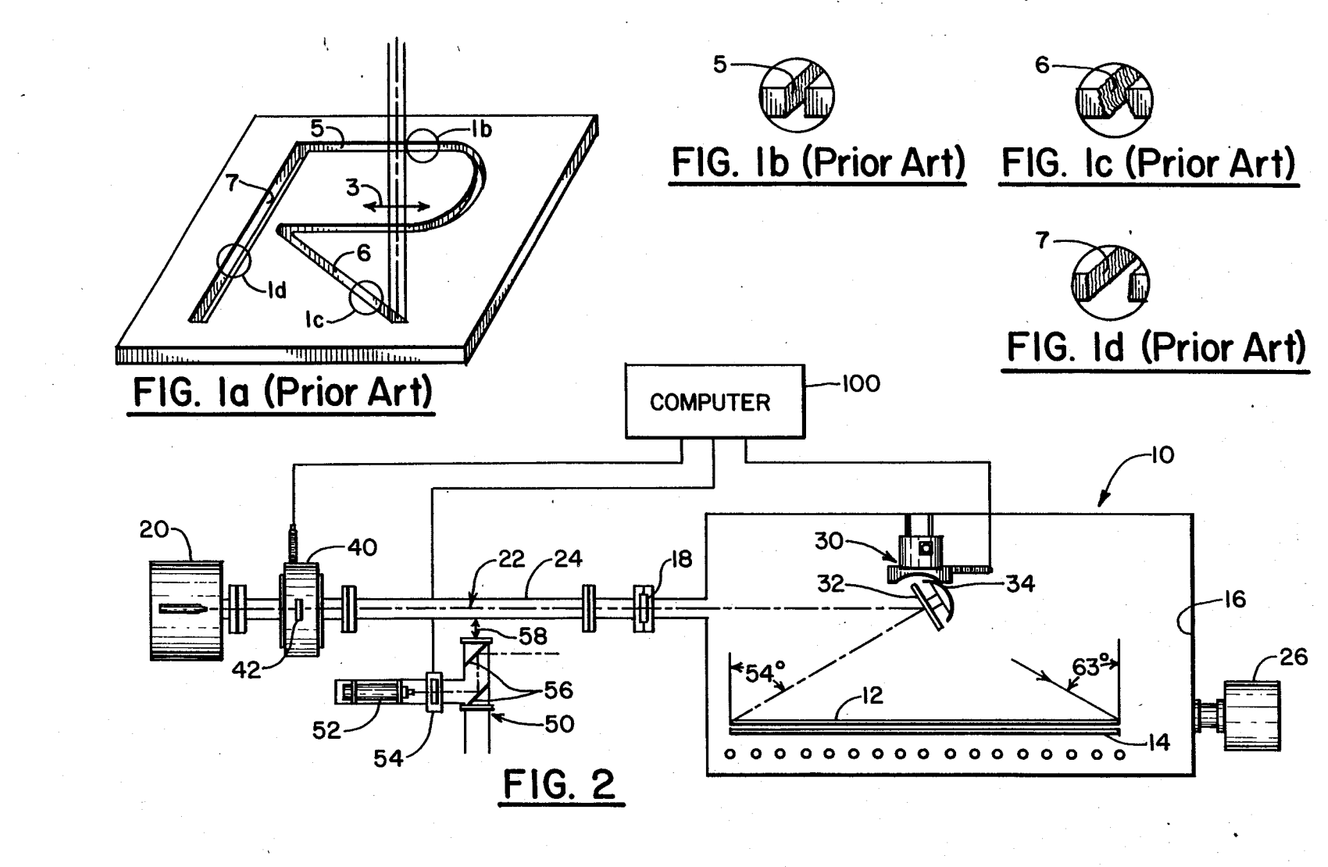
FIGS. 1a–1d (prior art) illustrate the effects of the direction of travel of a linearly polarized laser beam with respect to the plane of polarization.
FIG. 2 is a schematic representation of the laser welding system according to the present invention.

It is well known that when a specimen or work piece is moved under a fixed focus laser beam 1 at normal incidence, the kerfs cut by the laser beam 1 vary in characteristics, depending on the direction of movement in relation to the electronic or E-vector orientation or direction of oscillation. In FIG. 1a, the E-vector orientation, also referred to as the plane of polarization, of the laser beam 1 is indicated by the arrow 3. When the direction of travel of the cutting laser beam 1 in relation to the work piece 4 is parallel to the E-vector or plane of polarization 3, as illustrated at location 1b in FIG. 1a, the resulting kerf 5 shown in FIG. 1b is narrow, sharp, and even with perpendicular sidewalls. This condition is optimum and is the most efficient. The greatest cutting speed with the smoothest, straightest, narrowest kerf is achieved when cutting under this condition.

However, when the direction of travel of the cutting laser beam 1 in relation to the work piece 4 is oblique to the E-vector or plane of polarization 3, as illustrated at 1c in FIG. 1a, the resulting kerf 6 shown in FIG. 1c is broader with skewed sidewalls and rough edges. This condition is not as efficient or as desirable as the condition shown in FIG. 1b.

Further, when the direction of travel of the cutting laser beam 1 in relation to the work piece 4 is perpendicular to the E-vector or plane of polarization 3, as illustrated at 1d in FIG. 1a, the resulting kerf 7 shown in FIG. 1d is very broad and straight, but rough and non-uniform. This condition, while somewhat better than that shown in FIG. 1c, is still less efficient and less desirable than that shown in FIG. 1b.

Because of the phenomena described above, it has heretofore been generally understood as stated in current literature on this subject that linearly polarized laser radiation is unacceptable for contour cutting and probably has detrimental effects in welding as well. See, e.g., Dr. James T. Luxton, GMI Engineering and Management Institute, Flint, MI, "Optics for Materials Processing," in THE INDUSTRIAL LASER ANNUAL HANDBOOK, 1986 Ed., Penn Well/Laser Focus.

To overcome these problems with linearly polarized laser beams, it is common in the industry to convert linearly polarized beams to circularly polarized beams. Essentially, when electromagnetic radiation travels through a doubly refracting or birefringent crystal, two sets of wavelets propagate from every wave surface in the crystal, one set being circular and the other ellipsoidal. The rays that correspond to wave surfaces tangent to the spherical wavelets are undeviated and are commonly called the ordinary rays. The rays that correspond to wave surfaces tangent to the ellipsoids are deviated and are commonly called the extraordinary rays. When the ordinary and extraordinary rays in a doubly refracting crystal are separated, each ray taken alone is linearly polarized, but with directions of vibrations or E-vectors at right angles. However, when the crystal is cut with its faces parallel to the optic axis, so that radiation, incident normally on one of its faces, traverses the crystal in a direction perpendicular to the optic axis, the ordinary and extraordinary rays are not separated. They traverse the same path, but with different speeds. Upon emerging from the second face of the crystal, the ordinary and extraordinary rays are out of phase with each other and give rise to either elliptically polarized, circularly polarized, or linearly polarized light, depending upon a number of factors. Essentially, if the crystal has such a thickness to cause a phase difference of $\pi/2$ between the ordinary and extraordinary rays at the given frequency of the laser beam radiation, a circular oscillation or vibration results, and the radiation emerging from the crystal is circularly polarized.

Therefore, by insertion of an optical device such as that described above, commonly known as a quarter-wave plate, into the linearly polarized laser beam, the beam can be converted to a circularly polarized beam. Such a circularly polarized beam is equivalent for practical material processing purposes to unpolarized or randomly polarized radiation. Therefore, with such a circularly or randomly polarized laser beam, the worst or most adverse effects resulting from direction of beam travel as described above and illustrated in FIGS. 1a–1d can be avoided. However, at the same time, the optimum conditions illustrated by FIG. 1b are also sacrificed. Consequently, the result is somewhere between the best and worst conditions, which makes the cutting or welding workable for most applications, albeit not the most efficient.

There are, as mentioned above, a significant number of applications in which it is at least desirable, if not essential, to keep both the work piece and the laser generator stationary, yet to steer the laser beam in any desired direction on the work piece. As described above, the two problems encountered that have heretofore inhibited such a system are energy loss due to reflectance and unacceptable kerf variations. Previous systems have sought to minimize these effects by maintaining normal incidence to reduce reflection and converting the linearly polarized laser beam to a circularly polarized beam to reduce the kerf variations. Both of these prior art solutions are only partially effective and involve comprises. The normal incidence of the beam reduces reflection, but does not optimize or minimize reflection conditions, and the physical requirements and apparatus necessary to maintain normal beam incidence are cumbersome and confining. The circularly polarized beam avoids the worst kerf variations, but sacrifices the optimum conditions needed for the best kerfs and the most efficient cutting or welding.

Consequently, there remained prior to this invention a substantial need for a method and apparatus for laser welding that has the flexibility of a laser beam that can be steered easily in any direction over substantial areas as both the work piece and the laser generator remain stationary, yet which also minimizes reflection losses and allows the use of linearly polarized radiation for optimum efficiency and kerf production.

SUMMARY OF THE INVENTION

Accordingly, it is a general object of the present invention to provide a more efficient, flexible, and usable method and apparatus for laser welding than has been available heretofore.

A more specific object of this invention is to provide a laser welding method and apparatus that has the flexibility of a laser beam that can be steered easily in any direction over substantial areas as both the laser generator and the work piece remain stationary.

Another specific object of this invention is to provide a laser welding method and apparatus as stated above and which also minimizes reflection losses and allows the use of linearly polarized radiation for optimum efficiency and kerf production.

A further specific object of this invention is to provide a laser welding method and apparatus as stated above and in which the laser beam is steered from a single point in relation to the work piece.

A still further specific object of this invention is to provide a laser welding method and apparatus as stated above and in which the laser welding is operable efficiently at large angles of incidence with minimum reflection loss.

Yet another specific object of the present invention is to provide a laser welding method and apparatus in which the E-vector or plane of polarization of the laser beam is changeable to correspond with the direction of travel of the beam in relation to the work piece.

Additional objects, advantages, and novel features of the present invention shall be set forth in part in the description that follows, and in part will become apparent to persons skilled in the art upon examination of the following or may be learned by the practice of the invention. The objects and advantages of the invention may be realized and attained by means of the instrumentalities and in combinations particularly pointed out in the appended claims.

To achieve the foregoing and other objects and in accordance with the purpose of the present invention as embodied and broadly described herein, the method of this invention may comprise generally the steps of directing a laser beam of sufficient power to process a work piece, such as welding, fusing, machining, cutting, or marking, onto the work piece at an angle of incidence approximately the same as the polarizing or Brewster's angle, and rotating the plane of polarization of the beam so that the plane of polarization of the incident beam is oriented about parallel to the plane of incidence. The method can include steering the beam so that its incident spot on the work piece moves over a desired path or from place to place on the work piece while simultaneously rotating the plane of polarization as needed to maintain the plane of polarization of the incident beam parallel to the plane of incidence. Where cutting the work piece is the primary purpose, the method includes coordinating rotation of the plane of polarization of the incident beam with movement of the beam in relation to the work piece as necessary to keep it parallel to the direction of movement of the incident beam in relation to the work piece.

To further achieve the objects of this invention as embodied and broadly described herein, the apparatus of this invention may comprise a laser beam generator for generating a linearly polarized laser beam suitable for processing a work piece as desired, means for steering the laser beam over the work piece, and means for rotating the plane of polarization of the beam in relation to the work piece. The means for rotating the plane of polarization can be a half-wave retarder or any other suitable means. A computer can be connected to the means for rotating the plane of polarization and to the steering means or to translation drive means to coordinate rotation of the plane of polarization with the movement of the beam in relation to the work piece to maintain the plane of polarization parallel to the angle of incidence or parallel to the direction of travel of the beam in relation to the work piece as desired for any particular application according to this invention.

BRIEF DESCRIPTION OF THE DRAWINGS

The accompanying drawings, which are incorporated in and form a part of the specification illustrate the preferred embodiments of the present invention, and together with the description serve to explain the principles of the invention. In the drawings.

DETAILED DESCRIPTION OF THE PREFERRED EMBODIMENTS

Laser welding apparatus 10, according to the present invention, is illustrated generally in FIG. 2. A work piece 12 to be welded is positioned on a table 14 in a chamber 16, which can be a vacuum chamber. Again, as in the background discussion above, the term "welding" is used in this patent application for convenience and is understood to also mean cutting, machining, marking, and other similar laser material processing operations.

Laser generator apparatus 20 with sufficient power to accomplish the welding, such as a high-powered $CO_2$ infrared laser generator, is positioned outside the chamber 16. The laser generator 16 is preferably positioned in such a manner as to direct a laser beam 22 into the chamber 16 approximately parallel to the surface of the work piece to be welded. Of course, appropriate well-known optics (not shown) can also be used to direct the laser beam into the chamber 16 in the desired orientation. Where, as in the case illustrated in FIG. 2, the chamber 16 is a vacuum chamber, an appropriate sealed window 18, such as ZnSe, can be used to admit the beam 22 into the chamber 16. The ZnSe window 18 should be of high optical quality and anti-reflection (AR) coated to provide high transmittance of laser beam 22.

Beam steering apparatus 30 is mounted in the chamber 16 to steer or direct the laser beam 22 onto the work piece 12. It is preferred that the beam steering apparatus 30 be capable of directing the beam 22 to any location on the surface of the work piece 12. There are a variety of optical devices that can be used for such beam steering apparatus. For example, as illustrated in FIG. 2, a spectral mirror 32 is mounted on two goniometric cradles 34, such as models BG 120 and BG 160 manufactured by Klinger Scientific, stacked on top of each other to allow two-axis rotation with the point of rotation being on the surface of mirror 32. The mirror can be a water-cooled copper mirror or other optically suitable reflective device.

A significant feature of this invention is an automatically driven polarization controller 40 that is capable of rotating the direction of the E-vector or plane of polarization of the linearly polarized radiation emitted by the laser generator 20. There are a variety of devices that can be used to rotate the plane of polarization, some of which will be described in more detail below. The polarization controller 40 is preferably connected to and controlled by a computer 100 that also controls the beam steering apparatus 30. In this manner, the rotation of the plane of polarization of the laser can be coordinated with the steering of the laser beam onto the work piece to maintain optimum reflection and welding conditions in a manner that will be described in more detail below.

A low-power laser alignment apparatus 50 can also be used for properly aligning the work piece 12 under the steering apparatus 30 or for mapping the work piece and programming the computer 100 to steer the beam 22 in a desired welding path on the work piece. The low-power laser alignment apparatus 50 can comprise components similar to the high-power system, but with low-power, visible laser light: for example, a low-power visible light laser source, such as a HeNe laser generator 52, a polarization controller 54, and suitable optical components 56 to direct the low-power, visible laser beam into the window 18. For safety, the high-power laser beam 22 should be shrouded and enclosed, such as by beam housing 24 when it is in operation. Therefore, appropriate known means (not shown) for inserting the low-power alignment apparatus 50 into alignment with the window 18 can be provided, as generally indicated by the arrow 58 in FIG. 2.

The low-power rotation stage 54 can be connected to the computer 100 so that a pre-programmed welding path can be demonstrated and observed with the low-power visible laser beam. Such a visible demonstration can be used to place the work piece 12 in the proper position before the high-power welding beam 22 is applied. Also, with appropriate software, the low-power laser beam can be steered visibly to trace a desired path to be welded on the substrate while that traced path is programmed automatically into the computer by data from the steering apparatus 30. Then, with that desired path stored in the computer memory, the low-power alignment apparatus 50 can be removed, the high-power laser turned on, and the computer 100 can drive the steering apparatus 30 to duplicate the desired weld path with the high-power welding beam 22.

A vacuum pump 26 can be connected to the chamber 16 for evacuating chamber 16 as desired. Heating elements 28 can also be provided to heat work pieces to near melting or annealing temperatures or for other purposes as are known to or desired by persons skilled in the art of laser materials processing.

The principles and operation of this invention can be described with reference to FIG. 3, which is a schematic representation of the laser welding apparatus 10 according to this invention. In this illustration, a work piece 12 is comprises of two planar glass sheets 112, 212, such as borosilicate glass, the edges of which are being laser-welded or fused together, as shown at welded edge 312. A high-power infrared laser beam 22 is being directed by the two-axis moveable, goniometrically mounted spectral mirror 32 positioned above the center of the work piece 12. The E-vector orientation or plane of polarization of the linearly polarized beam segment 122 produced by the laser generator 20 is illustrated by the arrow 80. The computer 100 is connected to the respective drive mechanisms of both the beam steering apparatus 30 and the polarization controller 40.

The polarization controller 40, as illustrated in this example, is comprised of a half-wave retardation plate 42, such as a birefringent CdSe crystal, which is preferably AR coated. A suitable mounting and drive mechanism, such as a rotational stage, is schematically illustrated at 41. This kind of polarization controller apparatus is satisfactory for relatively low-power operating ranges, such as 400 $W_{cw}$. For welding systems operating at higher power levels, functionally equivalent, well-known reflective optics, such as two reflectors that each introduce quarter-wave retardation or a Fresnel-rhomb can be used for polarization rotation and control.

Figure 3:
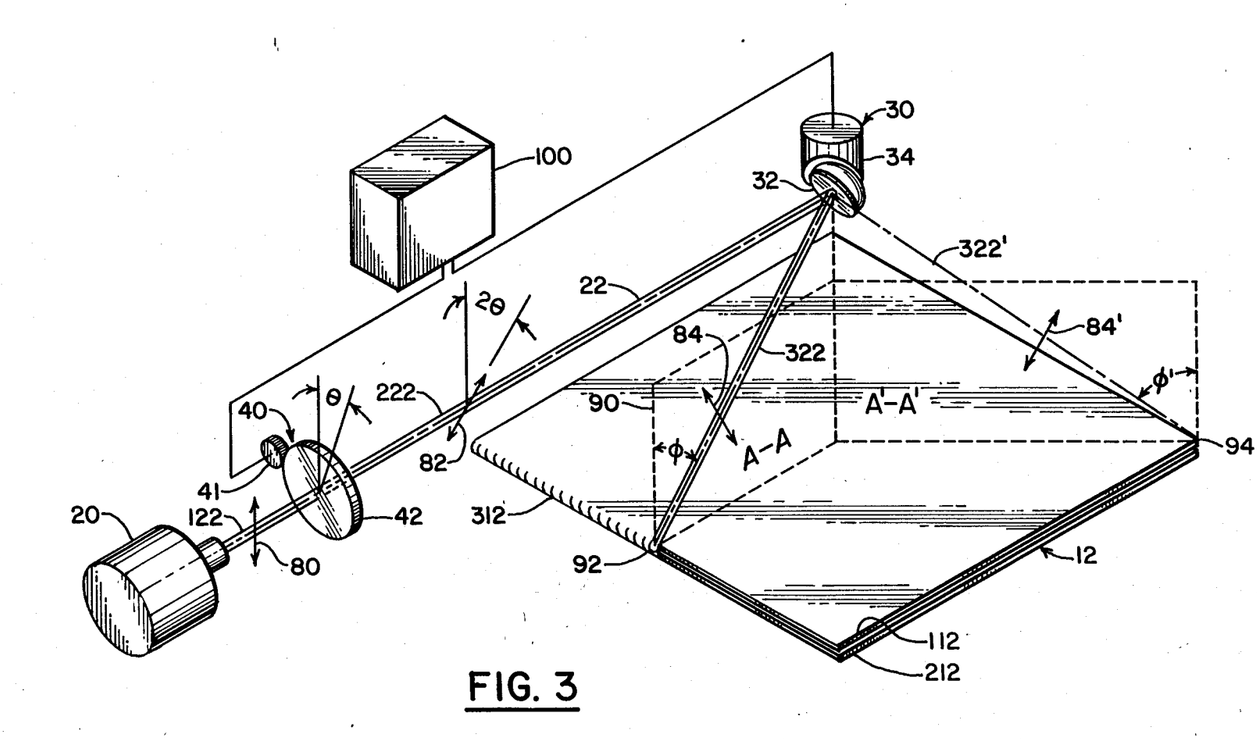
FIG. 3 is a schematic diagram in isometric showing the principal components and features of this invention.

Essentially, rotation of the half-wave retardation plate 42 by an angle $\theta$, as illustrated in FIG. 3, causes the E-vector orientation or plane of polarization 80 of the beam section 122 entering the plate 42 to rotate by twice that amount, i.e., $2\theta$, to the orientation indicated by arrow 82 in the beam section 222 emerging from the plate 42. Therefore, the E-vector orientation or plane of polarization of the beam section 222 and, consequently, of the beam section 322 reflected onto the work piece 12 can be controlled by the computer 100. The mirror 32 should be a front surface mirror that is corrected for phase retardation of the wavelength being used to maintain effective control of the plane of polarization of the reflected beam segment 322, as indicated by arrow 84.

It is known that at one particular angle of incidence, known as the polarizing angle or Brewster's angle, $\phi p$, no radiation is reflected except that in which the E-vector is perpendicular to the plane of incidence. Therefore, when radiation is incident on a non-absorbing material at the polarizing or Brewster's angle $\phi p$, none of the E-vector components parallel to the plane of incidence are reflected. (For absorbing materials, a minimum, but not zero, reflectance occurs at the angle of incidence where $\pi/2$ phase shift is introduced upon reflection, which is commonly called the principal angle of incidence.) The Brewster's angle $\phi p$ is a function of the refractive index n of the material in which the beam is traveling before reflection and the refractive index n' of the reflecting material, defined by the relation:

$$\tan \phi p = n'/n \tag{1}$$

The plane of incidence A—A in this example is a plane that coincides with the propagation direction of the beam section 322 and a line 90 normal to the work piece surface at the point of illumination or incidence 92. Therefore, if the E-vector orientation or plane of polarization 84 of beam section 322 is parallel to the plane of incidence A—A, and the angle of incidence $\phi$ is equal to or very near the Brewster's angle $\phi p$, reflection can be practically eliminated, or at least very effectively minimized.

Figure 4:
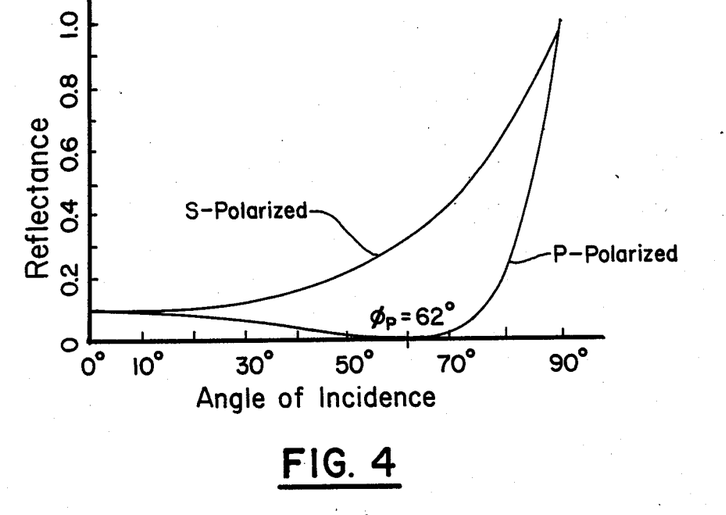
FIG. 4 is a graph illustrating reflectance as a function of angle of incidence for both P-polarized and S-polarized radiation.

When the E-vector 84 of the beam 322 is oriented parallel to the plane of incidence A—A, as described above, the radiation is called P-polarized. On the other hand, when the E-vector is oriented perpendicular to the plane of incidence, the radiation is called S-polarized. As shown by the graph in FIG. 4, illustrating reflectance as a function of angle of incidence for the borosilicate glass work piece (n'=1.9–0.1j at 10.6 $\mu$m) of the example being used herein, the reflection for P-polarized radiation is virtually eliminated at an angle of incidence $\phi$ equal to the Brewster's angle $\phi p$ of 62°. Even though borosilicate glass is absorbing at 10.6 $\mu$m, its reflection properties are those of a material with a real refractive index, thus, non-absorbing. In other words, in reality, the imaginary component of n' can be assumed to be zero when discussing reflection properties, since it is a dielectric and the absorption process is molecular in resonance with radiation frequency rather than caused by electron mobility in the material.

Consequently, for the example described herein involving welding the edges of a borosilicate glass work piece 12, the most efficient operation is achieved when the angle of incidence $\phi$ is maintained at or near the Brewster's angle $\phi p$ of 62°, and when the E-vector 84 is maintained parallel to the plane of incidence A—A.

As the steering apparatus 30 steers the beam segment 322 around the edges of the work piece 12 to accomplish the edge-welding process, both the angle of incidence $\phi$ and the E-vector orientation 84 tend to change unless controlled. The angle of incidence $\phi$ can be controlled by moving the work piece up and down or tilting it in relation to the mirror 32, or the distance or angle can be set at some practical optimum predetermined value, guided by the P-polarized curve in a graph such as FIG. 4. For example, the maximum range of variation of the angle of incidence φ in FIG. 3, occurs between the incident spot at the middle of a side, such as when beam 322 is focused at spot 92, and at a corner, such as at 94, when the beam moves to the position indicated at 322'. Therefore, near-optimum conditions can be achieved when the distance between the work piece 12 and mirror 32 is set such that the range between incident angle φ at point 92 and incident angle φ at point 94 is, for example, approximately 56° to 63°.

Of course, since the positions of the components are all relative, the assembly of the laser generator 20, polarization controller 40, and steering apparatus 30 can be moved in any desired direction or angle in relation to a stationary work piece to accomplish the same thing. In fact, the laser generator 20 itself could be mounted in a steering apparatus to direct or steer the beam.

Control of the E-vector orientation 84 to keep it parallel to the plane of incidence, i.e., P-polarized, is preferably accomplished by driving the polarization controller 40 to rotate the plane of polarization 82 of emerging beam segment 222 as the beam segment 322 moves along the programmed weld path. For example, when the beam segment 322 is moved around the edges of the work piece 12 to the position 322, the plane of incidence moves to the position A'—A'. Therefore, to keep the E-vector orientation or plane of polarization 84' parallel to the plane of incidence A'—A', i.e., P-polarized, the E-vector orientation 82 can be rotated simultaneously an appropriate or required amount 2θ by rotating half-wave retardation plate 42 through an angle θ. For a fixed physical system, the appropriate E-vector rotation 2θ required can be calculated as a function of the physical movement of the mirror 32 or other steering apparatus. For example, the polarization changes 2θ corresponding to rotation of mirror 32 about either of its two rotation axes can be expressed by the relationship:

$$2\theta = 90° - \arctan \frac{\sin\left[\arctan\left(\frac{\cot 2\Psi}{\sin\gamma}\right)\right]}{\tan\gamma} \quad (2)$$

where 2θ is the angle between the plane of incidence and the orientation of vibration of the E-vector and Ψ and γ are the two angles of rotation of mirror 32 about the respective two mirror axes, with Ψ=γ=0 for normal incidence on the glass surface.

Of course, the orientation of the plane of polarization could also be accomplished by rotating the laser generator 20 itself, even though it would require a more bulky and maneuverable mounting structure to do so. This method of control would also be within the scope of this invention.

The only component in the system that introduces significant phase retardation is the half-wave retardation plate 42. Therefore, nearly linearly polarized radiation can always be maintained with the E-vector orientation being a function of the orientation of the half-wave retardation plate 42. The half-wave retardation plate 42 can be mounted on appropriate apparatus such as a stepper-motor controlled rotation stage (not shown, but represented schematically in FIG. 3 at 41), and the appropriate orientation of the half-wave retarder 42 can be adjusted as a function of the orientation of the two goniometric cradles 34 to maintain P-polarization, thus avoiding reflection losses. As mentioned above, a computer 100 can be connected to both the steering apparatus 30 and the half-wave retarder drive 41 to move them simultaneously as required to accomplish the weld while maintaining P-polarization regardless of where the beam segment 322 is steered.

In reality, thermal expansion of the CdSe half-wave retardation crystal 42 can change the retardance. Therefore, cooling the CdSe crystal 42 may be necessary to minimize this effect, as well as to prevent heat from damaging the crystal. Such cooling can be provided, as is well known, by a stream of nitrogen gas. Also, the mirror 32 is a partial polarizer in the sense that reflectance varies slightly with the state of polarization. However, the effects can be kept comparatively insignificant with proper choices of materials and with other measures, such as cooling and careful alignment.

Figure 5:
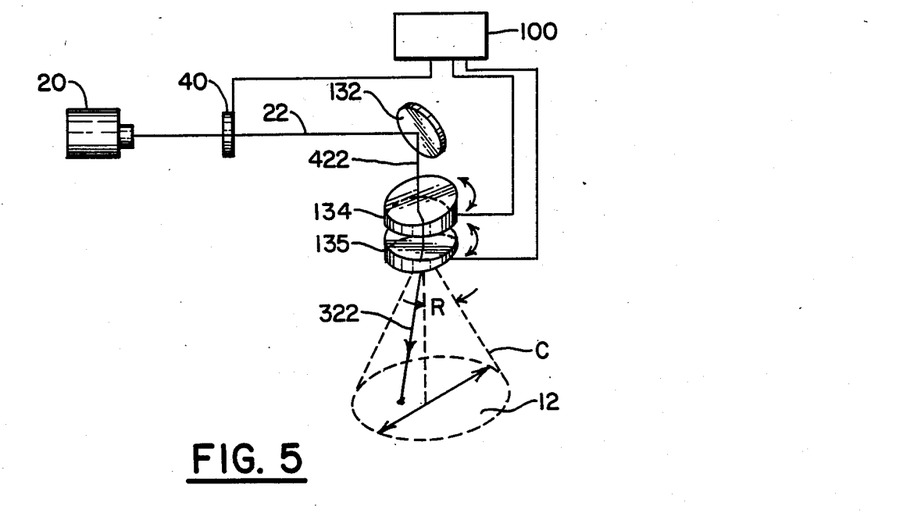
FIG. 5 is a schematic representation of another beam-steering embodiment according to this invention.

Another preferred steering embodiment 130 is shown in FIG. 5, which can be used as a substitute for the steering apparatus 30 in FIG. 3. In this embodiment 130, refractive optics instead of reflective optics are used to achieve two-axis beam-steering. After the beam 22 from laser generator 20 emerges from the polarization controller 40, it is reflected downwardly substantially normal to the surface of the work piece 12 by a stationary spectral mirror 132. The downward reflected portion 422 of the beam 22 is transmitted through a set of two wedge-shaped ZnSe windows 134, 135, which are preferably AR-coated to avoid reflection losses from the four interfaces. The ZnSe windows 134, 135 must also be of high optical quality to avoid wavefront distortion, and the wedge angle of each window 134, 135 should not be larger than approximately 20°.

With this apparatus 130, the beam 322 emerging from the wedge-shaped windows 134, 135 can be steered anywhere within a cone C having an angular radius R by rotating the windows 134, 135. The radius R is defined by the relation:

$$R = 2(n_w - 1)(A) \quad (3)$$

where $n_w$ is the refractive index of the windows 134, 135, and A is the wedge angle. Thus, with $n_w$ of ZnSe being 2.40, and choosing wedge angles of 20°, the radius R=56°.

Again, the rotation of windows 134, 135 to steer the beam segment 322 on the work piece 12 can be controlled by computer 100 along with polarization controller 40 to maintain P-polarization, as described above, for wide-angle welding or for cutting, as will be described in more detail below.

The polarization controller 40 in combination with laser material processing according to this invention can also be used advantageously to optimize laser cutting efficiency. As described in the background section above and shown in FIG. 1, the cleanest, sharpest kerfs, as well as the fastest and most efficient cutting are achieved when the direction of movement of the laser beam in relation to the work piece is parallel to the E-vector orientation or plane of polarization. Therefore, the polarization controller 40 according to this invention, can be used to rotate the plane of polarization of the laser cutting beam to remain parallel to the direction of travel of the beam in relation to the work piece; i.e., parallel to the direction that the cut is progressing.

If the beam in the cutting process is steered on the work piece, the polarization controller can be controlled and driven in coordination with the beam-steering mechanism similar to the manner described above, to keep the plane of polarization parallel to the direction the cut is progressing.

Figure 6:
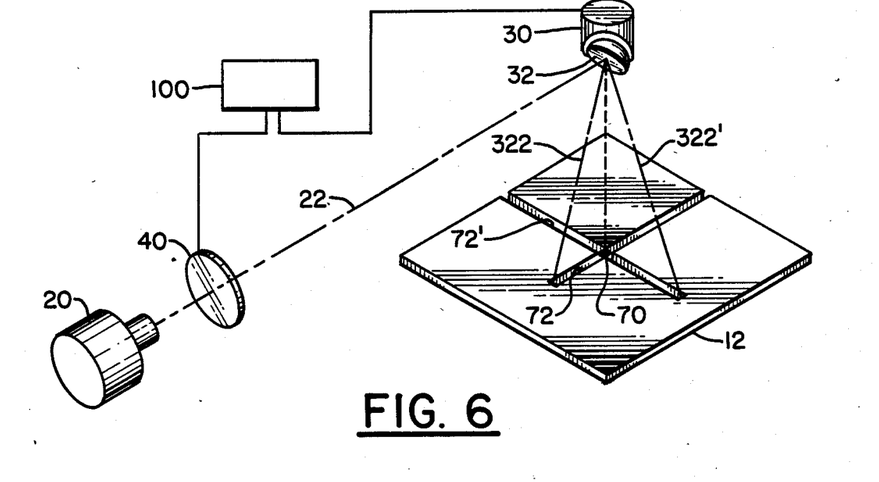
FIG. 6 is a schematic diagram of laser cutting with P-polarized radiation parallel to the plane of incidence according to this invention.

Further, maximum efficiency can be maintained by maintaining P-polarization. However, P-polarization and E-vector orientation in the direction the cut 72, 72' is progressing can be maintained together only when the beam incidence is normal to the work piece surface or when the direction of cut is progressing radially inward or outward from a point 70 directly under the steering mirror 32, as illustrated in FIG. 6. Therefore, wide-angle cutting at the Brewster's angle in any direction other than on a radius extending through center point 70 may not be practical.

Figure 7:
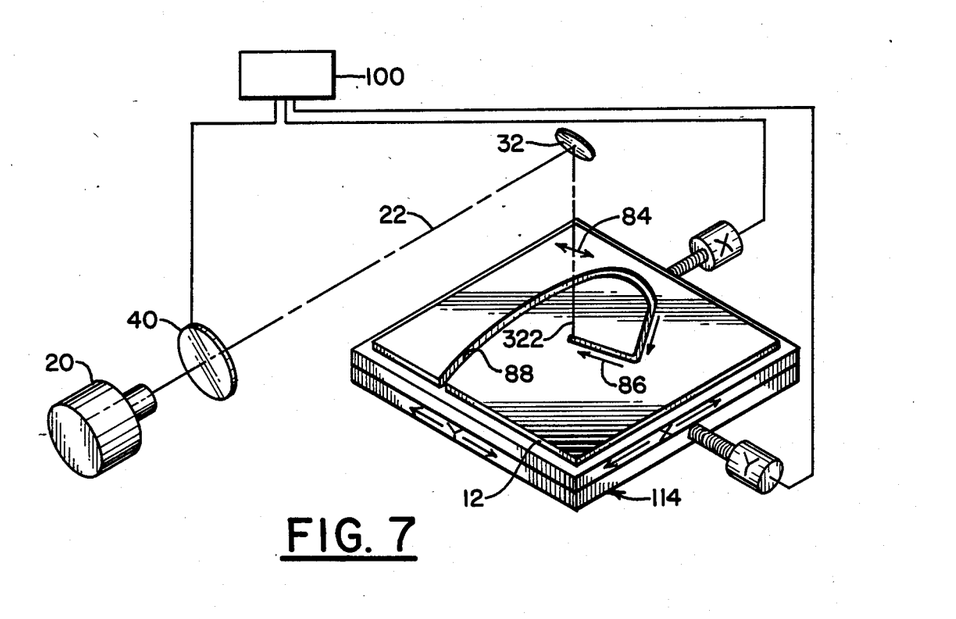
FIG. 7 is a schematic diagram of laser cutting using the polarization controller to keep the E-vector orientation of linearly polarized radiation parallel to any cutting direction according to this invention.

The greatest cutting utility of the present invention, therefore, may be to use the polarization controller 40 in conjunction with a normal incidence laser cutting beam, as shown in FIG. 7, to rotate the E-vector orientation 84 of the beam simultaneously with a change of direction of cut progression 86 at all times. Such E-vector rotation can be coordinated with work piece translation for stationary beam apparatus, or with beam steering for stationary work piece apparatus. For example, as illustrated in FIG. 7, the X and Y drives of an X-Y translation stage 114 used for moving a work piece 12 under a stationary, normal incidence beam 322 can be connected to the computer 100 to coordinate the E-vector 84 rotation with the direction of progression 86 of a cut 88 at any point and on a real-time basis. Thus, even though normal incidence rather than wide Brewster's angle incidence is used in this cutting application, the more efficient and desirable linearly polarized cutting beam can be used in all directions according to this invention, rather than having to resort to less efficient circularly polarized beams to avoid the problems associated with cut progressions not parallel to the plane of polarization.

Upon understanding the principles of this invention, as described above, particular manufactured components and computer programming necessary to practice the invention are within the knowledge and capabilities of persons ordinarily skilled in these relevant arts. Therefore, there is no need for them to be discussed in more detail here.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention as defined by the claims which follow.

The embodiments of the invention in which an exclusive property or privilege is claimed are defined as follows:

1. The method of applying a laser beam to a work piece, comprising the steps of:
    directing a linearly polarized laser beam through polarization controller means capable of adjustably rotating the plane of polarization of the laser beam;
    directing the beam emerging from said polarization controller means to steering means capable of redirecting the path of said beam;
    manipulating said steering means to redirect said beam onto a work piece; and
    rotating the plane of polarization of said laser beam so that the plane of polarization or E-vector of the beam is parallel to the angle of incidence.

2. The method of claim 1, including the step of continuing to manipulate said steering means to steer the point of incidence of the beam on the work piece to different locations on the work piece and simultaneously rotating the plane of polarization of the laser beam to maintain the plane of polarization parallel to the plane of incidence.

3. The method of claim 2, including the step of maintaining the angle of incidence of the laser beam on the work piece at approximately the polarizing or Brewster's angle as the point of incidence is moved over the work piece and as the angle of polarization is maintained parallel to the angle of incidence.

4. The method of claim 1, including the step of rotating the plane of polarization by adjustably manipulating said polarization controller means.

5. The method of claim 4, including the step of directing the laser beam through polarization controller means in the form of a half-wave retarder and rotating the half-wave retarder to rotate the plane of polarization of the laser beam.

6. The method of claim 3, including the step of redirecting said beam onto the work piece by intercepting the beam with a spectral mirror and rotating said spectral mirror about two orthogonal axes that both extend through the point of incidence of the beam on the spectral mirror.

7. The method of claim 3, including the step of redirecting said beam onto the work piece by intercepting said beam with a spectral mirror to redirect said beam to a different linear path, passing said redirected beam through a wedge-shaped window, and rotating said wedge-shaped window.

8. The method of claim 7, including the step of steering said redirected beam on the work piece by passing said redirected beam through a plurality of wedge-shaped windows in sequence and rotating said wedge-shaped windows the appropriate amount to steer said redirected beam where desired on the work piece.

9. The method of claim 1, including the step of moving either the work piece or the redirected beam on said work piece in relation to the other, and simultaneously rotating the plane of polarization of the beam to maintain said plane of polarization oriented parallel to the direction of travel of the beam in relation to the work piece.

10. The method of applying a laser beam to work piece, comprising the steps of:
    generating a linearly polarized laser beam;
    directing the laser beam onto the work piece at an angle of incidence $\phi$ polarizing or Brewster's angle, wherein the angle of incidence $\phi$ is the angle between the propogation direction of the laser beam and a line normal to the work piece surface at the point of illumination or incidence; and
    rotating the plane of polarization of the beam such that the plane of polarization of the incident beam on the work piece is maintained approximately parallel to the place of incidence.

11. The method of claim 10, including the step of steering the incident beam over the work piece and simultaneously rotating the plane of polarization as necessary to maintain the plane of polarization approximately parallel to the plane of incidence as the beam moves to different locations on the work piece.

12. Laser material processing apparatus for welding, fusing, machining, marking, or cutting a work piece with a laser beam, comprising:

means for providing a linearly polarized laser beam;

work piece support means for supporting the work piece in the path of the laser beam; and polarization controller means for rotating the plane of polarization of said laser beam in relation to the work piece; and beam-steering means for directing and steering the laser beam to maneuver the incident spot of the laser beam on the work piece over selected paths and to various locations on the work piece.

13. The laser material processing apparatus of claim 12, wherein said polarization controller means and said steering means are controlled together in a coordinated manner such that said polarization controller means rotates the plane of polarization of the beam in synchronization with the steering means to keep the plane of polarization of the incident beam on the work piece parallel to the plane of incidence.

14. The laser material processing apparatus of claim 13, wherein the work piece support means is moveable in relation to the laser beam in such a manner that the angle of incidence of the beam on the work piece can be maintained at approximately the polarizing or Brewster's angle.

15. The laser material processing apparatus of claim 13, wherein the assembly of the laser beam generator means, the polarization controller means, and the steering means is moveable in relation to the work piece to steer the incident spot of the beam on the work piece while maintaining the plane of polarization of the beam parallel to the plane of incidence and maintaining the angle of incidence at about the polarizing or Brewster's angle.

16. The laser material processing apparatus of claim 13, including computer means connected to said polarization controller means and to said steering means for coordinating the polarization controller means together with the steering means to keep the plane of polarization of the beam parallel to the plane of incidence regardless of where the beam is steered over the work piece.

17. The laser material processing apparatus of claim 12, wherein said polarization controller means includes half-wave retarder means and rotation means for rotating the plane of polarization of the beam.

18. The laser material processing apparatus of claim 12, wherein said steering means is positioned between said polarization controller means and the work piece.

19. The laser material processing apparatus of claim 18, wherein said steering means includes a mirror positioned in the path of the beam and which is rotatable about two orthogonal axes extending through the point of incidence of the beam on the mirror.

20. The laser material processing apparatus of claim 18, wherein said steering means includes a rotatable wedge-shaped window in the path of the beam.

21. The laser material processing apparatus of claim 20, wherein said steering means includes a plurality of rotatable, wedge-shaped windows positioned in sequence in the path of the beam.

* * * * *